United States Patent [19]

Mallon et al.

[11] 4,333,349

[45] Jun. 8, 1982

[54] BINARY BALANCING APPARATUS FOR SEMICONDUCTOR TRANSDUCER STRUCTURES

[75] Inventors: Joseph R. Mallon, Franklin Lakes; Anthony D. Kurtz, Englewood, both of N.J.

[73] Assignee: Kulite Semiconductor Products, Inc., Ridgefield, N.J.

[21] Appl. No.: 194,034

[22] Filed: Oct. 6, 1980

[51] Int. Cl.³ .............................................. G01L 19/04
[52] U.S. Cl. ....................................... 73/708; 73/727; 73/754; 338/3; 338/4
[58] Field of Search ................ 73/708, 721, 727, 754, 73/DIG. 4; 338/3, 4, 2

[56] References Cited

U.S. PATENT DOCUMENTS

| | | | |
|---|---|---|---|
| 3,245,252 | 4/1966 | First et al. | 73/766 |
| 3,646,815 | 3/1972 | Martin et al. | 73/727 |
| 3,873,956 | 3/1975 | Kurtz et al. | 338/2 |
| 3,886,799 | 6/1975 | Billette et al. | 73/727 |
| 3,900,811 | 8/1975 | Kurtz et al. | 338/2 |
| 4,016,644 | 4/1977 | Kurtz et al. | 29/583 |

FOREIGN PATENT DOCUMENTS 613219  6/1978  U.S.S.R. ............... 73/708

Primary Examiner—Donald O. Woodiel
Attorney, Agent, or Firm—Arthur L. Plevy

[57] ABSTRACT

There is disclosed a balancing network for a piezoresistive semiconductor bridge configuration. The balancing network comprises a plurality of series resistors arranged in series with the sensing elements in the bridge configuration. Each resistor differs from the previous one according to a power of two to form a binary ladder arrangement. The individual resistors are associated with terminals to allow the transducer manufacturer to selectively short one or more resistors to provide zero balance compensation. The resistors are located on the nonactive portion of the semiconductor substrate and are fabricated by the same techniques employed for fabrication of the semiconductor piezoresistive sensing elements to assure temperature tracking of the unit with the desired temperature operating range.

19 Claims, 5 Drawing Figures

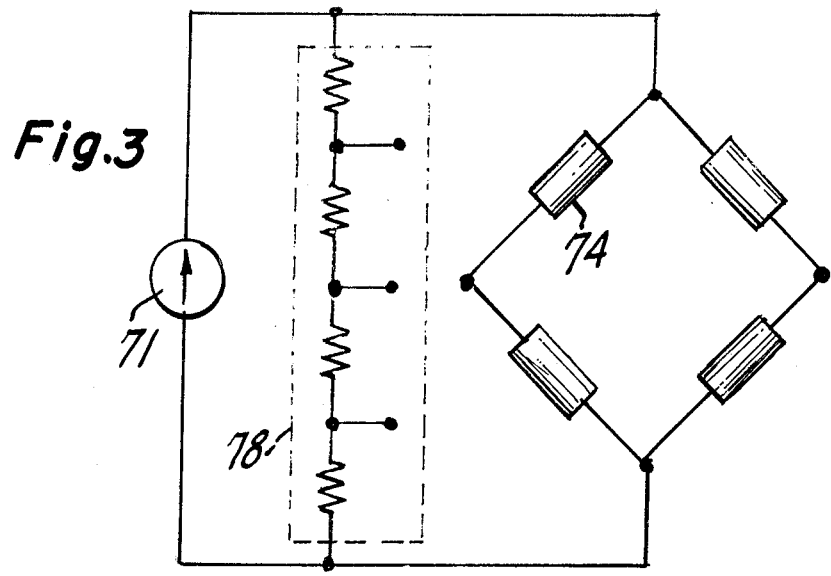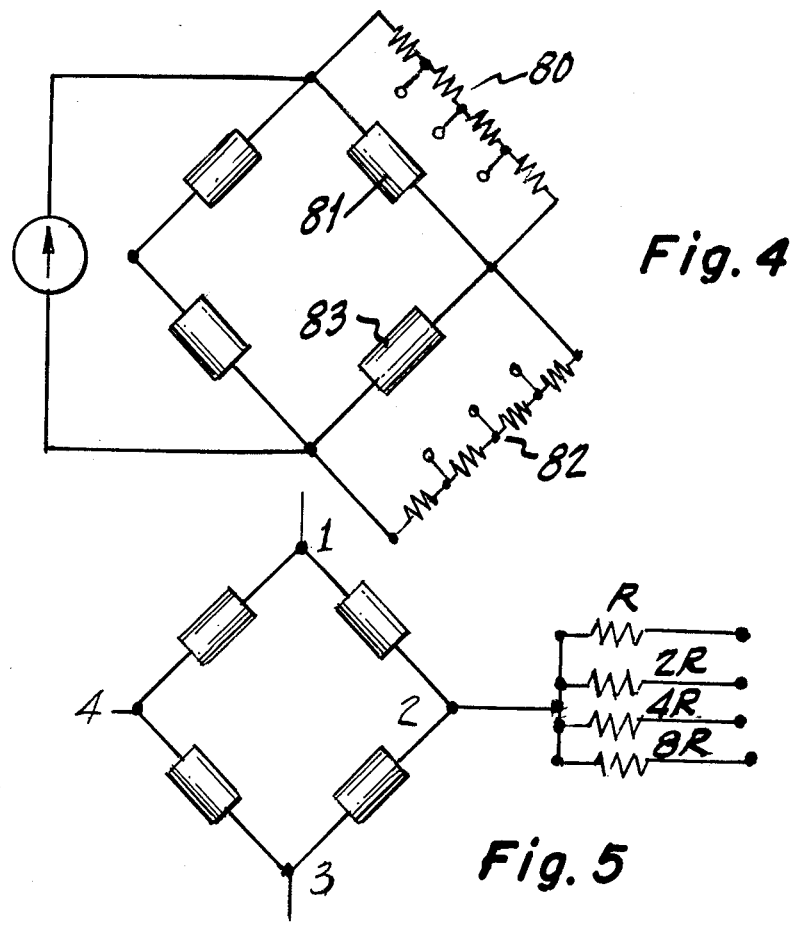

BINARY BALANCING APPARATUS FOR SEMICONDUCTOR TRANSDUCER STRUCTURES

BACKGROUND OF THE INVENTION

This invention relates to integrated circuit semiconductor transducer structures and more particularly to a binary balancing apparatus for providing compensation of such a transducer.

The prior art is replete with a large number of patents and literature disclosing transducers which are fabricated from piezoresistive elements, which elements may be integrally diffused within a diaphragm of semiconducting material such as silicon. Such devices are fabricated using solid state techniques which basically involve the diffusion or deposition of a force sensitive arrangement of piezoresistors on a semiconductor diaphragm. The integral silicon transducers are conventionally formed in a four active arm Wheatstone bridge configuration, which bridge assembly provides an output proportional to pressure and/or deflection. The stress sensors or piezoresistors are typically arranged so that two elements of the four are subjected to tension and two are subjected to compression. This type of arrangement has been referred to in the prior art as an integral or integrated transducer and the terminology is used to denote the fact that the piezoresistive sensing elements are actually deposited, diffused or otherwise formed on a semiconductor substrate employing fabrication techniques used in integrated circuit technology.

Based on the above noted technology, such transducers have been formed which are extremely small, rugged and relatively economical. Examples of typical structures which possess many of the attributes indicated above can be had by referring to U.S. Pat. No. 4,016,644 entitled METHODS OF FABRICATING LOW PRESSURE SILICON TRANSDUCERS issued on Apr. 12, 1977 to A. D. Kurtz, U.S. Pat. No. 3,935,634 entitled METHODS OF FABRICATING INTEGRATED TRANSDUCER ASSEMBLIES issued on Feb. 3, 1976 to A. D. Kurtz et al., U.S. Pat. No. 3,900,811 issued on Aug. 19, 1975 to A. D. Kurtz et al., U.S. Pat. No. 3,873,956 entitled INTEGRATED TRANSDUCER ASSEMBLIES issued on Mar. 25, 1975 to A. D. Kurtz et al. All of the above patents are assigned to the assignee herein and in general, involve and describe integrated transducer structures and techniques for fabricating the same.

The transducer configuration as a half bridge array or a full Wheatstone bridge array is widely employed and is an extremely typical arrangement. In such transducers it is necessary to compensate the transducer in regard to temperature variation as well as balancing the transducer for optimum operation. Essentially, temperature compensation of a transducer is well known and involves compensating circuitry which provides a compensating effect for variations of the semiconductor transducer over a wide range of temperature operation. In regard to such techniques, the prior art has proposed many different approaches. For example, U.S. Pat. No. 3,886,799 entitled SEMICONDUCTOR PRESSURE TRANSDUCER EMPLOYING TEMPERATURE COMPENSATION CIRCUITS AND NOVEL HEATER CIRCUITRY issued on June 3, 1975 to Billette et al. and assigned to the National Semiconductor Corporation shows one approach. This patent describes a voltage regulator which is coupled to a Wheatstone bridge including a Zener diode and associated transistor circuitry for compensating a bridge and the voltage supply over a wide range of temperatures. Other patents such as U.S. Pat. No. 3,245,252 entitled TEMPERATURE COMPENSATED SEMICONDUCTOR STRAIN GAGE UNIT issued on Apr. 12, 1966 to D. J. First et al. disclose an arrangement of series and shunt resistors which essentially are used to provide temperature compensation for the bridge configuration. This patent is relatively typical of the prior art technique of performing zero shift and zero balance.

For purposes of explanation, zero shift compensation refers to compensation of the transducer null or zero pressure reading as a function of temperature. Zero balance is the compensation of a transducer for zero pressure applied to the transducer. For example, a transducer may be temperature balanced and hence, its zero output change will be relatively small as the temperature changes or varies. However, the transducer may still provide an undesired voltage level when no pressure is being applied to the active portion of the diaphragm. This also must be compensated for, as for example, it is desirable to have the transducer indicate an approximately zero voltage output for no applied pressure at all temperatures over its operating range. In present technology, due to the fact that the piezoresistors which form the bridge are all deposited simultaneously by the same technique on the same diaphragm, these sensors, for practical purposes, perform very well over wide temperature ranges. Due to the fact that the resistors are also positioned in close proximity and deposited by the same technique, they are relatively temperature matched and the reading at zero pressure is relatively constant with temperature variations.

It is relatively easy to zero balance an integral semiconductor bridge by employing suitable resistors, which are often, according to prior art, temperature insensitive resistances. Such resistors do not normally vary resistance value as a function of temperature or if temperature sensitive resistors are used for balance, their temperature characteristics are not identical to those of the bridge elements. Moreover, temperature gradients often exist between the location of the bridge elements and a suitable location for balance resistors. Thus, the inclusion of a balance resistor can, in general, be expected to cause an unwanted change in zero balance with temperature because it changes the temperature characteristics of the bridge element to which it is added. This effect can be overcome by adding several resistors to the bridge network, but this is an additional complication and moreover, these resistors can contribute to a lack of zero stability in the transducer. Present technology allows for the manufacture of a semiconductor transducer which exhibits essentially no zero shift and excellent zero stability and repeatability. Thus, the addition of compensating resistors only serves to degrade transducer performance. Hence, adjusting for both zero balance and temperature shift is extremely complicated and difficult to implement and compromises the temperature performance.

Other factors which are peculiar to integrated circuit transducer configurations make the balancing of such units even more difficult by the use of discrete components as those employed in the prior art and hence, the entire procedure become extremely difficult and time consuming. In fact, such balancing procedures are accommodated by computer aided programs, which programs implement a complete circuit analysis for a given resistive array for each individual transducer to arrive at specified values for a resistive arrangement such as that arrangement depicted in U.S. Pat. No. 3,245,252.

It is therefore an object of this invention to provide a simple and reliable balancing configuration for an integrated circuit transducer, which compensating arrangement serves to provide zero balance extremely efficiently, thus circumventing and avoiding many of the above noted problems.

BRIEF DESCRIPTION OF THE PREFERRED EMBODIMENT

In an integrated semiconductor transducer arrangement of the type employing a bridge configuration of integrated piezoresistive sensing elements, with said integrated elements deposited on a semiconductor substrate by an integrated circuit technique, the combination therewith of balancing apparatus for providing a zero shift and balance for said configuration comprising a binary resistive ladder comprising a plurality of resistors, each one differing in value from each other by a factor of two and arranged in series with at least one section of said bridge, and means for selectively bypassing desired ones of said resistors according to an output from said transducer upon application thereto of a zero reference pressure, said resistive ladder deposited on said diaphragm according to the same technique as employed for deposition of said piezoresistors.

BRIEF DESCRIPTION OF THE FIGURES

FIG. 3 is a schematic diagram of still another alternate balancing approach;

FIG. 4 is a schematic diagram of another alternate balancing approach; and

FIG. 5 is a schematic diagram of another embodiment of the balancing technique.

DETAILED DESCRIPTION OF THE INVENTION

Figure 1:
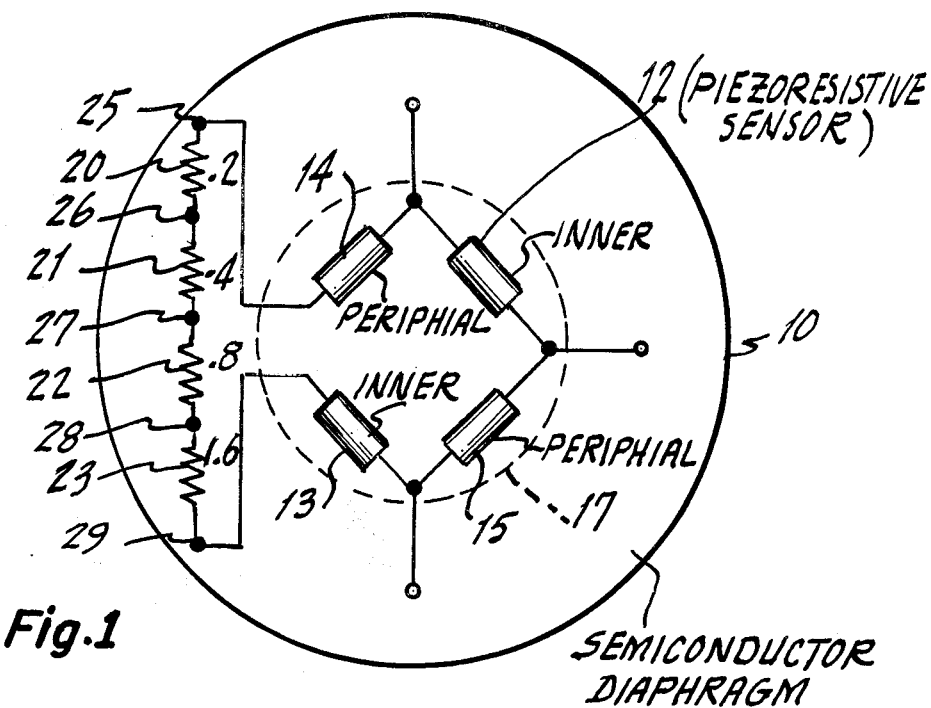
FIG. 1 is a top plan view of a transducer arrangement employing a binary balancing apparatus according to this invention.

Referring to FIG. 1, there is shown a schematic diagram of a conventional Wheatstone bridge arrangement, which bridge arrangement is formed by piezoresistors 12-15. Each piezoresistor, as indicated, is diffused or otherwise deposited on a semiconductor diaphragm 10. Shown on the diaphragm 10 is a dashed line configuration 17 representing the active portion of a diaphragm and is that portion which deflects upon application of a force to the transducer structure. This aspect of a diaphragm configuration as well as techniques for clamping the diaphragm to a housing structure are shown in U.S. Pat. No. 3,654,579 entitled ELECTROMECHANICAL TRANSDUCERS AND HOUSINGS issued on Apr. 4, 1972 to A. D. Kurtz et al. and assigned to the Assignee herein. As is known, the piezoresistors as 12-15 are fabricated on the semiconductor substrate by means of diffusion, epitaxial growth and essentially according to techniques known, in the semiconductor art and described, for example, in the above noted patent.

The area outside of the dashed line 17 defines the nonactive region and has fabricated thereon an arrangement of compensating resistors 20-23. The resistors 20-23 appear in series with transducers 14 and 13 forming one side of the bridge arrangement. The resistors 20-23 are deposited upon the diaphragm in the nonactive region by the same process used to form the piezoresistors 12-15. Fabrication of integrated circuit resistors is well known in the prior art and such devices are deposited by the same techniques used to formulate piezoresistors.

The configuration of resistors as 20-23 form a binary ladder. Specifically, resistor 20 is deposited with a first predetermined value. Resistor 21 is deposited having twice the magnitude of resistor 20. Resistor 22 is deposited having twice the magnitude of resistor 21 or four times the magnitude of resistor 20. Resistor 23 is deposited having twice the magnitude of resistor 22 or eight times the magnitude of resistor 20. As one can ascertain, each resistor increases by twice the value of the previous resistor in the series configuration. The circuit structure can be designated as a binary ladder as each resistor varies according to the appropriate power of two.

Shown in FIG. 1 are terminals designated as 25-29. These terminals are formed on the integrated circuit as land areas and are used to selectively short out any desired resistances within the ladder. By employing a binary ladder arrangement as described, one eliminates the need for precise individual resistors as indicative of the prior art, while further assuring that each and every resistor 20-23 exhibits relatively the same temperature characteristics as each of the piezoresistors 12-15. This factor is achieved by the deposition of the binary ladder on the same exact substrate and by the same exact technique as used in depositing the piezoresistors.

In employing a binary ladder configuration, the manufacturer now measures the output voltage of the transducer with zero applied pressure. He then, according to predetermined calculations, shorts out one or more of the resistors as 20-23 and upon doing so, is assured of an optimum zero balance for that transducer configuration. In this manner, typically four resistors are required to compensate for all variations of a transducer structure as shown in FIG. 1. As one can ascertain, there are five terminals as 25-29 which are coupled to five output leads or wires to enable selective shorting of all desired resistors according to the particular output of a transducer as depicted in FIG. 1. This compensation can be achieved during the production process by directing each of the leads associated with terminals 25-29 to a separate terminal of a typical housing or header and the pins on the housing or header can then be shorted according to a table formulated according to the zero output voltage.

While FIG. 1 depicts the technique for a circular type diaphragm, it is understood that the technique depicted can be used with any integrated circuit transducer assembly and has particular applicability and use with transducer assemblies of any geometrical configuration such as square configurations and so on.

The resistors 20-23 comprising the ladder are extremely stable and essentially exhibit the same temperature coefficient as those resistors 12-15 comprising the bridge and hence, one can achieve zero balancing, while being assured that unwanted zero shifts are not introduced.

Figure 2:
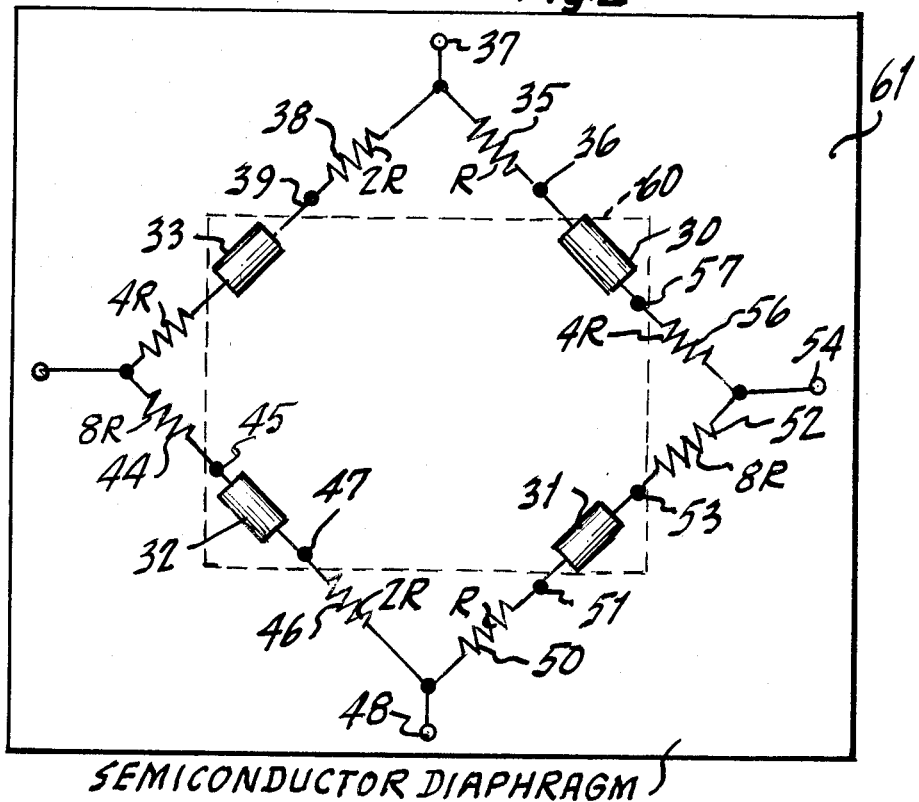
FIG. 2 is an alternate embodiment according to this invention.

Referring to FIG. 2, there is shown another arrangement of a compensating technique employing a binary resistive arrangement. Essentially, the configuration depicted employs the piezoresistors 30-33 which are arranged in a full Wheatstone bridge configuration and as indicated above, exhibit the piezoresistive effect. In this configuration, the binary ladder is in series with each arm of the bridge to enable compensation by including or excluding resistors from respective bridge arms.

In FIG. 2, the resistor labelled 35 is in series with the sensing element 30 and is located between terminals 36 and 37. This resistor is assigned the first binary value of, for example, is R where R=n ohms. Resistor 38 in series with sensor 33 between terminals 37 and 39 has a value of 2R or twice the value of resistor 35. Resistor 40 also in series with sensor 33 has a value of 4R and is located between terminals 41 and 42. Resistor 44 has a value of 8R and is located between terminals 41 and 45 and is in series with sensor 32. Resistor 46 in series with sensor 32 is located between terminals 47 and 48 and has a value of 2R. Resistor 50 located between terminals 48 and 51 and in series with sensor 31 has a value of R, while resistor 52 located between terminals 53 and 54 in series with sensor element 31 has a value of 8R and resistor 56 located between terminals 54 and 57 in series with element 30 has a value of 4R. In this manner, the values of the resistors about the bridge in series with the elements constitute a binary ladder as resistor 38 is twice the magnitude of resistor 35, resistor 40 is four times the magnitude of resistor 35 with resistor 44 being eight times the magnitude of resistor 35 and so on.

As one can ascertain from the structure depicted in FIG. 2, with this arrangement the resistors in corresponding sides of the bridge are also equal as resistor 40 equals resistor 56 and resistor 44 equals resistor 52. Resistor 38 equals resistor 46 and resistor 35 equals resistor 50. Terminals 37,41,48 and 54 are common bridge terminals. Hence, to perform compensation in this arrangement, one need only bring out a minimum number of wires. For example, if it is determined that compensation be required, resistor 38 and resistor 35 can be shorted by bringing out lead 36 or lead 39 and coupling that lead to lead 37. Hence, the configuration depicted in FIG. 2 affords a reduction of one wire over the configuration depicted in FIG. 1, while providing the same balancing action.

It can be seen in FIG. 1 that the output terminal on the left side of the bridge will be either terminal 25 or terminal 29, depending on whether it is necessary to add resistance to bridge element 14 or bridge element 13. This results in two different wiring configurations for the resulting transducer.

The circuit of FIG. 2 has the most important advantage of providing a constant circuit configuration.

As can also be seen from FIG. 2, the piezoresistive sensors 30 to 33 are included on the active area 60 of a diaphragm with the resistors forming the binary ladder on the inactive portion of the diaphragm 61. It is also known that resistors such as 38, 40 and other resistors forming the binary ladder can be deposited in a particular orientation on the semiconductor substrate, which orientation will render the same insensitive to pressure variations, which pressure variations or forces act on the active area of the diaphragm.

FIG. 2 shows a relatively square shaped diaphragm and an example of such semiconductor structures can be had by a copending application entitled SEMICONDUCTOR TRANSDUCERS EMPLOYING FLEXURE FRAMES by A. D. Kurtz et al., Ser. No. 21,960 filed on Mar. 19, 1979. In this application, a pressure transducer such as the one in FIG. 2 employs a semiconductor diaphragm with a top surface having located thereon, a central boss area surrounded or framed by a continuous groove of a predetermined width. Piezoresistive sensors as 30-33 are formed on the bottom surface of the diaphragm with a first sensor adjacent the outer edge of the groove and a second sensor parallel to the first sensor to form a first pair, as for example, 30 and 32. On the opposite end of the groove, a second pair of sensors are formed as 31 and 33, both positioned with respect to each other and the groove as above described. The groove operates as a stress concentrating area to enable the sensors to provide a relatively large linear output upon application of a force thereto. The square geometry of this device renders it relatively stiff in regard to forces which are in a direction parallel to the edges of the boss and as described in the copending application.

In any event, the above described binary ladder compensating technique is applicable to such transducer configurations with the resistive ladder deposited on the inactive portion of the diaphragm or in the non-groove portion of the diaphragm.

The above technique as described is particularly applicable to integrated transducer elements. For example, based on present technology, a piezoresistor such as 30-33 of FIG. 2 or 12-15 of FIG. 1 may be fabricated as a single doped line having a thickness of approximately 1/10 of a mil of 0.0001" with a length of about 0.008". The length can, of course, be varied according to the magnitude desired. As one can ascertain, based on the extremely narrow widths which are essentially 25000 angstroms, it is difficult to obtain resistor matching of better than two percent. Due to the extremely close line widths which are implemented by photolithographic techniques, if a piezoresistor is off by two percent in resistance, one can achieve an unbalance of forty percent of full scale or more. If one attempts to balance this condition by the use of an external temperature insensitive resistor, one then can introduce a zero temperature shift of five or ten percent of full scale per 100° F. Hence, by providing zero balancing to such an arrangement, one would then have to compensate for temperature shift to zero as well and would therefore need to employ prior art techniques comprising numerous shunt and series resistors in order to achieve a constant balance. Even if an attempt were made to balance with a temperature sensitive resistor, one would face the difficulty of matching the temperature coefficients of the bridge elements. Thus, zero shifts would occur. Moreover, such an arrangement is very sensitive to temperature gradients.

The binary ladder technique, however, permits balancing without affecting the zero shift with temperature. While a binary arrangement permits the most efficient technique of balancing over a large range of initial zero readings to a relatively small final zero reading, the binary relationship is not mandatory. For instance, several equal resistors of value R will provide a substantial ability to balance this class of transducer. Moreover, other relationships between the balancing elements are also usable.

As shown in regard to FIGS. 1 and 2, the binary ladder in FIG. 1 is essentially in series with one side of the bridge as 13 and 14, while the binary ladder configuration of FIG. 2 is essentially in series with both sides of the bridge. Based on the nature of a Wheatstone bridge, the binary ladder arrangement such as the arrangement of resistors 20-23 can be placed in series with the input wires of the bridge to shunt a constant current source to thereby control excitation voltage to the bridge and thus its pressure sensitivity. Thus, normalization of bridge sensitivity to very tight tolerances may be achieved. This technique may also be used with constant voltage when a series element is added to form a voltage divider forming a quasi constant current arrangement. Alternately, for constant voltage excitation, the ladder may be placed across the output terminals. This allows the output to be trimmed by virtue of the output shunting action of the ladder network.

Thus, as shown in FIG. 3, a constant current source 71 supplies a biasing current to the bridge configuration comprising piezoresistors as 74. The source is shunted by a binary ladder 78 with resistor values of increasing magnitude according to powers of two. Resistors within the ladder structure 78 can be shorted to control the current applied to the bridge. The ladder 78 would be fabricated during the same process employed for forming the sensor elements as 74 and hence, would exhibit relatively the same temperature characteristics and would also be arranged to be non-responsive to applied pressure or positioned on the nonactive area of the substrate.

FIG. 4 is a schematic diagram of an alternate balancing approach. The embodiment depicted in FIG. 4 shows a first binary resistor ladder 80 which shunts the piezoresistor 81 forming part of the Wheatstone bridge array. A second binary ladder 82 is placed in shunt with piezoresistor 83. According to this configuration, by shorting selected ones of the resistors in the array, one can achieve both adjustment of the resistance of the piezoresistive elements as above described and also can obtain zero balance of the bridge and adjustment in regard to pressure or forces.

FIG. 5 depicts a basic bridge configuration having terminals designated as 1-4. The resistive ladder is, as indicated, fabricated simultaneously with the fabrication of the transducers and the resistors are arranged in a binary format as indicated on FIG. 5. In this manner, a resistor is selected to be in parallel with one of the terminals as, for example, by connecting the opposite end of the resistors shown to terminals 1 or 3 as required. The resistor selected thus provides the necessary compensation for the bridge array as above described.

It is, of course, understood that the resistive bridge as shown in FIG. 5 can be inserted in series with any of the terminals to obtain the desired compensation. It is important to note that this technique permits balancing of the bridge without effecting the zero shift with temperature. The binary arrangement or ladder technique permits a most efficient way of balancing over a large range of initial zero readings to a relatively small final zero reading. It is a main purpose to provide balancing of the transducer configuration, while maintaining proper relationship between the balancing element and assuring that the balancing elements are fabricated on the same substrate or utilize the same process as used for forming the piezoresistive elements.

Although the above figures depict a four arm Wheatstone bridge configuration which is a typical transducer structure, it is understood that one can employ a half-bridge configuration and use the compensating techniques described above to arrive at the same benefits. In the half-bridge configuration, two sensors are required such as sensors 13 and 15 of FIG. 1 and in lieu of piezoresistors 12 and 14, one can employ two fixed resistors which are oriented such that they do not exhibit any piezoresistive effect and hence, do not vary resistance as a function of pressure. Such resistors as 12 and 14 can also be fabricated, if desired, on the nonactive portion of the semiconductor diaphragm substrate as 10 to assure that they will not be pressure responsive. It is therefore apparent that there are modifications which can be derived from the preceding description and therefore such modifications can be made without departing from the scope of this invention as more particularly defined by the appended claims.

We claim:

1. A pressure transducer apparatus containing one or more piezoresistive elements formed by an integrated circuit technique arranged in a bridge array on a force responsive member, the combination therewith comprising:

an array of resistive elements formed by said integrated circuit technique simultaneously with said piezoresistive elements and arranged in a series relationship with respect to said piezoresistive elements forming said bridge array and means coupled to said array for selectively bypassing one or more of said resistive elements to obtain an effective adjustment of the resistance of said piezoresistive element.

2. The transducer according to claim 1 wherein said array of piezoresistors is a Wheatstone bridge configuration wherein said resistive array operates to adjust the zero balance when one or more of said resistive elements are bypassed.

3. The transducer according to claim 1 wherein bypassing resistive elements effects the force sensitivity of said bridge.

4. The transducer according to claim 1 wherein said resistive array comprises a plurality of resistors arranged in a magnitude to differ one from the other in a binary format.

5. In an integrated semiconductor transducer arrangement of the type employing a bridge configuration of integrated piezoresistive sensing elements, with said elements deposited on a semiconductor substrate by an integrated circuit technique, the combination therewith of balancing apparatus for providing a zero shift and balance for said bridge configuration, comprising:

a binary resistive ladder comprising a plurality of resistors, each one differing in value from each other by a factor of two and arranged in series with at least one section of said bridge, and means for selectively bypassing desired ones of said resistors according to an output from said transducer upon application thereto of a zero reference pressure, said resistive ladder deposited on said diaphragm according to the same technique as employed for deposition of said piezoresistors.

6. The combination according to claim 5 wherein said substrate constitutes a force responsive diaphragm with a first portion of said diaphragm adapted to deflect upon application of a force thereto, and a second portion restrained from deflection with said piezoresistors deposited on said first portion and said binary resistive ladder deposited on said second portion.

7. The combination according to claim 5 wherein said resistive ladder comprises at least four resistors in series, with the first resistor having a value of R, R equal to n ohms, where n is a positive number with a second resistor having a value of 2R, with a third resistor having a value of 4R, and with at least said fourth resistor having a value of 8R.

8. The combination according to claim 5 wherein said means for bypassing desired ones of said resistors includes a separate terminal located between each resistor in said series to enable a shorting conductor to be emplaced between said terminals for bypassing any desired one of said resistors.

9. The combination according to claim 6 wherein said diaphragm is circular.

10. The combination according to claim 6 wherein said diaphragm is rectangular.

11. The combination according to claim 5 wherein said section of said bridge is the output section of said bridge from which an output voltage level according to an applied pressure is obtained.

12. The combination according to claim 5 wherein said section of said bridge is the input section of said bridge to which a source of biasing potential is applied.

13. The combination according to claim 5 wherein said section of said bridge is an arm of said bridge wherein said resistive ladder is in series with at least one of said piezoresistors.

14. The combination according to claim 5 wherein said integrated circuit technique is a diffusion process.

15. A transducer apparatus, comprising in combination:
   an integrated circuit transducer assembly, including a semiconductor substrate manifesting a force sensitive diaphragm having an active area adapted to deflect upon application of a force to said diaphragm and a second area relatively insensitive to deflection upon application of a force thereto, four piezoresistive elements forming a bridge array deposited within said active area by an integrated circuit technique, with at least two of said elements connected in series with a binary resistive ladder comprising a plurality of integrated resistors deposited by the same integrated circuit technique on said substrate within said second area, each of said resistors differing in value from each other by a factor of two, and means coupled to said resistors for selecting desired ones of said resistors whereby said selection determines the zero balance of said transducer assembly.

16. The transducer apparatus according to claim 15 wherein said integrated circuit technique is a diffusion process.

17. The transducer according to claim 15 wherein said substrate is fabricated from silicon.

18. The transducer according to claim 15 wherein said bridge array is a Wheatstone bridge array.

19. The transducer according to claim 15 wherein said means for selecting desired ones of said resistors includes a separate terminal area located between each resistor in said series to enable a shorting conductor to be emplaced between said terminals for bypassing any desired one of said resistors to thereby accomplish said selection.

* * * * *